(12) United States Patent
Saur

(10) Patent No.: US 8,667,392 B2
(45) Date of Patent: Mar. 4, 2014

(54) AUTOMATED SUBMISSION OF FOLDED PRINT JOB

(75) Inventor: Drew D. Saur, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1963 days.

(21) Appl. No.: 11/609,636

(22) Filed: Dec. 12, 2006

(65) Prior Publication Data

US 2008/0141151 A1    Jun. 12, 2008

(51) Int. Cl.
*G06F 17/00* (2006.01)
*G06F 3/12* (2006.01)

(52) U.S. Cl.
USPC .......................................... 715/273; 358/1.1

(58) Field of Classification Search
USPC .................................. 715/273, 274; 358/1.1
See application file for complete search history.

(56) References Cited

U.S. PATENT DOCUMENTS

| | | | |
|---|---|---|---|
| 5,840,003 A | 11/1998 | Meetze, Jr. et al. | |
| 5,967,963 A | 10/1999 | Gotting | |
| 6,032,004 A | 2/2000 | Mirabella, Jr. et al. | |
| 6,205,452 B1 | 3/2001 | Warmus et al. | |
| 6,311,142 B1 * | 10/2001 | Glassner | 703/1 |
| 6,551,229 B1 | 4/2003 | Shipherd et al. | |
| 6,952,275 B2 | 10/2005 | Ramot et al. | |
| 2002/0051206 A1 * | 5/2002 | Masaki | 358/1.18 |
| 2002/0086786 A1 | 7/2002 | Kamizuru et al. | |
| 2003/0227652 A1 * | 12/2003 | Masaki | 358/1.18 |
| 2004/0071529 A1 | 4/2004 | Kawatsu et al. | |
| 2004/0177325 A1 * | 9/2004 | Keane et al. | 715/530 |
| 2005/0187088 A1 | 8/2005 | Tsukuba et al. | |
| 2005/0283735 A1 * | 12/2005 | Ferlitsch et al. | 715/771 |
| 2006/0055100 A1 | 3/2006 | Suzuki et al. | |
| 2007/0143671 A1 * | 6/2007 | Paterson et al. | 715/527 |
| 2007/0143696 A1 * | 6/2007 | McComber | 715/764 |
| 2007/0146784 A1 * | 6/2007 | Perry et al. | 358/1.16 |
| 2008/0068621 A1 * | 3/2008 | Terhaag | 358/1.1 |

OTHER PUBLICATIONS http://www.cip4.org/documents/jdf_specifications/JDF_1.3.pdf), pp. 440-441, Dec. 11, 2006.

* cited by examiner

*Primary Examiner* — Rashawn Tillery
(74) *Attorney, Agent, or Firm* — Gibb & Riley, LLC

(57) ABSTRACT

Techniques are provided for receiving user requests for a document job. The document job prints characteristics for making markings on a media sheet and an indication to perform fold operations for creating a folded piece. User inputs to identify the outside page designation of the folded piece, first fold direction, fold type, and an outside portion designation. The "outside page designation" indicates the side of the media sheet to contain markings to appear on the exterior of the folded piece. The input for the direction of the first fold includes whether the direction of the first fold is perpendicular to the relatively longer or shorter end of the sheet. After printing, automatic folding of the media sheet(s) into the folded piece is enabled using only the outside page designation, the direction of the first fold, the type of fold, and the outside portion designation.

17 Claims, 6 Drawing Sheets

FIG. 4A

| Folding | Advanced: Simple Cross |

None

Simple

Advanced: Simple Cross ✓

Step 1 of 5: Please specify which page of the uploaded document contains the matter that will comprise the outside of the folded piece. *(If your fold will result in parts of both pages on the outside of the folded piece, either section is valid.):*

⦿ Page 1
○ Page 2

Step 2 of 5: Please indicate the direction of your piece's first fold:

⦿ Perpendicular to the long end of the piece
○ Perpendicular to the short end of the piece ○ Square piece; please describe position of the first fold:

[                          ]

Step 3 of 5: Pages of submitted file should be folded:
○ Individually, as separate pieces
⦿ Together, as single unit (for multi-page job submissions only)

Step 4 of 5: Please choose from one of the following fold categories:
○ Parallel Folds: These folds are distinguished by having one or more folds that are in parallel with one another (that is, no folds are perpendicular to the original fold).
⦿ Cross Folds: These folds are distinguished by having one or more folds that are perpendicular to the original fold.

Step 5 of 5: Please select your Cross fold:

| Simple Cross ✓ |

To FIG. 4B

AUTOMATED SUBMISSION OF FOLDED PRINT JOB

BACKGROUND

Embodiments herein generally relate to electrostatographic printers and copiers, reproduction machines, as well as any machine or manual operation that provides folding operations, and more particularly, concerns a method, system, service, and/or computer program, that provides a more useful user interface to the folding choices available.

Remotely-instantiated document submission to highly automated digital workflows is rapidly becoming the industry standard for document production. Standards and user interface paradigms that can eliminate communication bottlenecks are useful in ensuring that such digital workflows can provide the cost and efficiency benefits that are critical to success. While most job parameters (such as the specification of color, paper, size, binding, etc.) have been relatively simple to represent and communicate via digital interfaces, the specification of folding remains a common bottleneck in digital workflows. The embodiments herein are useful with printing/copying/finishing devices that provide folding options and that allow users to remotely operate such printing/copying/finishing devices or operate such printing/copying/finishing devices in a self-serve, unassisted manner.

In the production document finishing environment, there are few factors that involve more potential confusion than in the folding arena. Even the simplest of folds have a number of potential alternative variations, and it is all too often up to the finishing provider to pre-suppose the designer's intent when determining the "correct" way to fold a printed piece. Historically, document designers have communicated more than the simplest folding intent to print providers by producing a hand-folded "mock-up" of a proof to the provider, in an effort to eliminate confusion. As print job specification and submission is increasingly handled online, however, such a method of communicating folds becomes impractical, if not impossible, adding a substantial layer of inefficiency to a process that is otherwise intended to provide a great deal of convenience and efficiency.

A number of computer-based folding intent user interface paradigms are available and are used in a variety of scenarios, from desktop-based print drivers to Internet-based submission system. For example, one method for processing user inputs in an automated folding process is disclosed in U.S. Patent Publications 2006/0055100, 2005/0187088 and 2004/0071529, the complete disclosures of which are incorporated herein by reference. On the surface, such systems seem quite adequate but careful consideration of these reveals serious shortcomings. For instance, one current print driver offers a few folding options for users who have the necessary finishing equipment installed. These drivers offer a few simple folds, such as middle, three-panel letter/brochure, and three-panel accordion (aka "concertina") folds, all selectable via a simple radio button series in the finishing user interface. Likewise, many Internet-based job submission systems offer similar user interfaces.

In these user interfaces, if a user selects, for instance, the seemingly-simple three-panel "letter" fold, it is not possible to predict the physical result without an example of a finished piece in hand. This is because there are four potential variations of this fold for each orientation of the piece (i.e., landscape or portrait). While it is generally easy for the end user to specify the piece's orientation, it is not possible to specify the direction the folds take (i.e., toward the front or the back of the piece), or which of the piece's thirds are folded first (i.e., the top or bottom). To make matters worse, while a person folding a letter using this fold may speak in terms of the "top" or "bottom" of the piece, a person designing a brochure using the identical fold may label the corresponding parts "left" and "right."

In the case of a job being submitted to an in-house printing system, an experienced designer will have typically internalized the way the existing equipment processes a fold, and he or she will design a piece accordingly. However, this designer will still likely run a folded proof to ascertain that all is well before performing a final run. Therefore, even the simplest of folds often require human intervention.

In the case of a designer submitting a piece to an unknown, remote printing system, however, the designer typically will not even have the luxury of running a piece through the production equipment two or three times to "get it right." In this case, the designer must take the time to find a way to communicate the folding intent to the printer, either verbally or via a mockup, and it will almost always be necessary for the designer to request a proof to validate that the communication was successful. This presents a less-than-optimum solution.

Other solutions provide a standardized set of folds that users can specify to printers who have purchased, licensed, or are familiar with a specific system. Such systems are not universal, are prohibitively expensive, and comprehending the various folds still involves a substantial amount of human effort and consideration.

SUMMARY

One feature is that the embodiments herein are "facing" (i.e., front and back) and "orientation" (i.e., top, bottom, left, right) agnostic. In other words, the embodiments herein operate irrespective of the manner in which the sheets are facing or oriented. Instead, the method and system disclosed herein can be used simply with only the constraints regarding the inside or outside of the work piece, the direction of the first fold, and the type of fold. The embodiments herein are designed to be presented via a standard computer user interface, and involve engaging the user in a simple two-step process, where the user first specifies a few simple characteristics of the computer file that is to be produced in folded hardcopy. After these characteristics have been defined, the user then specifies the fold desired and, optionally, some information about the finished piece that enables the finishing personnel or automated equipment to accurately determine the correct way of folding the piece. This method could apply even when folding machines are not used. This method communicates a fold that a human or a machine can interpret unambiguously. Of course, if a machine is used, the entire process can occur without human intervention. But even without a machine, the method permits a human being to interpret the folding intent unambiguously.

More specifically, embodiments herein include a method, system, computer program, and/or service that receives a user request through a graphic user interface for a document job. The document job includes printing characteristics for making markings on a sheet of media and an indication to perform a fold operation for folding the sheet of media into a folded piece. The embodiments herein acquire user inputs to identify an outside page designation of the folded piece, to identify a direction of a first fold, and to identify a type of fold. The "outside page designation" has the user identify which side of the sheet of media contains markings that will appear on the exterior of the folded piece (after the sheet of media is folded into the folded piece). When acquiring the input for the direction of the first fold, the method inquires whether the direction of the first fold is perpendicular to the relatively longer end or the relatively shorter end of the sheet of media.

After determining what type of fold will be performed, the method can also acquire user input to identify an outside portion designation of the outside page. The "outside portion" is that portion of the outside page that will appear on the outside of the folded piece. In other words, while a sheet of media only has two sides (e.g., first page) and second page), only a portion (e.g., ½, ⅓, ¼, etc.) of one of these sides will actually appear on the outside of the piece after it is folded. The folded piece will have an "outside," which is the portion that the viewer would normally start reading or viewing, and an "inside." Therefore, this point in the process asks the user to identify that portion of one side of the unfolded sheet that should appear on the outside of the folded piece.

The process of finding out where the outside portion is located is an inquiry process that is different for different types of folds. Thus, the process of acquiring the outside portion designation can present different questions to the user depending upon the type of fold identified when acquiring the type of fold.

After the sheet(s) of media are printed, the embodiments herein enable the automatic folding of the sheet(s) of media into the folded piece using only the outside page designation, the direction of the first fold, the type of fold, and the outside portion designation. The process of automatically folding is performed by a machine without human intervention, although in the absence of such automating equipment, this information may be used with human intervention to unambiguously comprehend the folding intent.

The user inputs regarding outside page designation, direction of first fold, type of fold, and outside portion can be gather through any form of user interface such as radio buttons, icons, dialogue boxes, etc. At least one embodiment provides multiple choice questions to the user. These multiple choice questions can comprise a textual or graphic question and multiple pre-established responses. The pre-established responses can comprise textual responses and/or non-textual graphical responses.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIGS. 4A and 4B are schematic diagrams of a user interface according to embodiments herein.

DETAILED DESCRIPTION

The embodiments described herein provide an easy-to-comprehend and reliable system for communicating folding intent for a wide variety of the most common folds irrespective of the manner in which the folds are "facing" (i.e., front and back) or "orientation" (i.e., top, bottom, left, right). The methodology herein can concentrate only on the inside or outside of the piece, because the present inventors have determined a methodology, system, etc. that operates using only information regarding the inside/outside constraint, first fold direction constraint, and type of fold constraints. The embodiments herein are designed to be presented via a standard computer user interface.

The embodiments engage the user in a two-step process, where the user first specifies a few simple characteristics of the computer file that is to be produced in folded hardcopy. After these characteristics have been defined, the user then specifies the fold desired and, optionally, some information about the finished piece that enables the finishing personnel or automated equipment to accurately determine the correct way of folding the piece. Thus, the embodiments described herein provide an easy-to-comprehend and much more reliable system for communicating folding intent for a wide variety of the most common folds. This information is collected by the software system, and provides sufficient information for the piece to be properly finished in its entirety, even in an unassisted manner in a production environment that supports end-to-end production automation.

Figure 1:
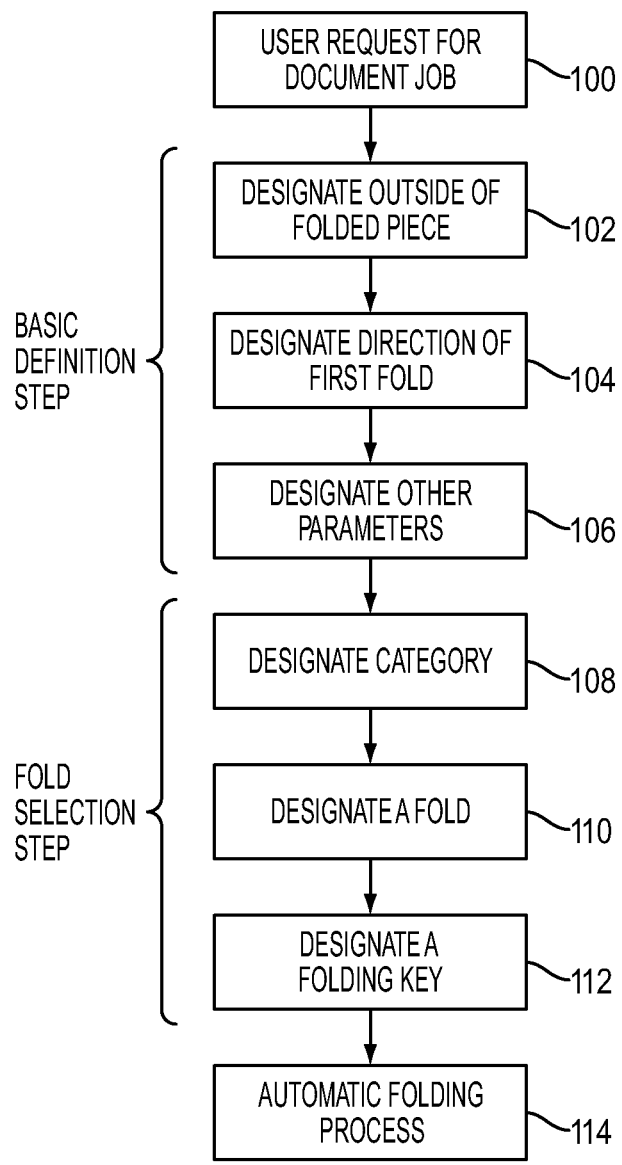
FIG. 1 is a flowchart illustrating a method disclosed herein.

Thus, embodiments herein include a method, system, computer program, and/or service that receives a user request 100 through a graphic user interface for a document job (FIG. 1). The document job 100 includes printing characteristics for creating markings on a sheet of media and an indication to perform a fold operation for folding the sheet of media into a folded piece. In items 102-106 the embodiments herein (which can be termed the "basic definition step") allow the user to specify parameters for the fold operation. This method could apply even when folding machines are not used. This method communicates a fold that a human or a machine can interpret unambiguously. Of course, if a machine is used, the entire process can occur without human intervention. But even without a machine, the method permits a human being to interpret the folding intent unambiguously.

One parameter that is defined in item 102 is which page ("Page 1" or "Page 2") of the document contains the matter that will comprise the outside of the folded piece. The embodiments herein acquire user inputs to identify an outside page designation of the folded piece. The "outside page designation" has the user identify which side of the sheet of media contains markings that will appear on the exterior of the folded piece (after the sheet of media is folded into the folded piece). In the case of folds that result in parts of both pages on the outside of the folded piece, the user can be asked to specify which page is to be considered the "outside" page (Page 1).

In item 104, the process acquires input for the direction of the first fold. This involves determining whether the direction of the first fold is perpendicular to the relatively longer end or the relatively shorter end of the sheet of media. This can be thought of in terms of portrait or landscape for pages that are not square, but instead are non-square rectangles, triangles, or other geometric shapes that have one side shorter and one side longer (e.g., standard letter size, standard legal size, A4 size, 5×7, 4×6, etc. sheets of paper). For square pieces (or all pieces) of media the user can alternatively designate the direction of the first fold relative to the orientation of a particular portion of the printed matter (e.g., parallel or perpendicular to the portion of the printed matter). Therefore, the user can indicate the direction of the first fold relative to the long or short end of the sheet of media or relative to the orientation of a particular portion of the printing on the sheet (e.g., parallel or perpendicular to the portion of the printing).

In item 106, many other parameters could be defined, such as whether a document or job containing multiple pages should have its pages folded individually or together, as a single unit, etc.

In the next processing 108-112 (which can be termed the "fold selection step") the user is presented with a wide selection of predetermined (pre-established) folds to choose from. In one example, to help the user more quickly narrow down folding choices, folds can be divided into high-level categories, such as parallel folds and cross folds (e.g., where all folds are parallel to one another, or where some of the folds cross). The user can optionally be asked to choose among these categories in item 108. One ordinarily skilled in the art would understand that the folds can be characterized and organized in any manner that the designer envisions would be helpful to the user in comprehending the nature of the folds. In addition, item 108 can represent a selection process through a hierarchical arrangement of multiple categories and sub-categories.

In this example, parallel folds are distinguished by having one or more folds that are all in parallel with one another (that is, no folds are perpendicular to the original fold) and cross folds are distinguished by having one or more folds that are perpendicular to (that are non-parallel to or cross) the original fold. This categorization is not essential to the embodiments herein, but it helps designers or document submitters to more efficiently identify the desired fold. The list may be expanded to help designers or submitters to intuit other types of folds that may be offered.

Then in item 110, after the one or more categories are selected, the user is asked to choose from a limited list of folds that are within the selected category or sub-category. Alternatively item 108 can be skipped and the user can be asked to choose a pre-established fold from the list in item 110 without choosing a category or by choosing all categories in item 108.

Each category in item 108 comprises a variety of folds. For each fold, a number of features of the fold can be supplied to the user through the graphic user interface in item 110. For example, the name for the fold, a textual description of the fold (in its most basic terms), graphic descriptions of the fold, etc. can be supplied to the user. Both the name and the description of the fold can avoid any details that are unique to a fold's individual variations, and instead can focus only on those characteristics that are common to all variations of the fold. The user may peruse this list of folds to select the one that represents his or her intent.

After the user has indicated the initial folding parameters (i.e., page containing exterior content, direction of first fold, fold category, etc.), the mere selection of a fold in item 110 may be sufficient for final, accurate communication of folding intent in many cases. For instance, in the case of a simple "middle" fold, where a piece is simply folded in half, the finishing provider will know which direction to perform the fold without requiring the submitter to provide any further information. In the automated scenario, each of the folds specified could be easily mapped to a fold specified by the JDF standard as seen in FIG. 7-20 of the JDF 1.3 specification (pages 440-441 of http://www.cip4.org/documents/jdf_specifications/JDF 1.3.pdf).

Embodiments herein ask the user to specify one or more additional pieces of information regarding the presentation of the finished piece in item 112. For convenience, these pieces of information are sometimes referred to herein as "folding keys." A folding key comprises the answer to one or more simple questions about the look of the finished, folded piece.

The folding key can comprise a process of acquiring user input to identify a portion of the unfolded sheet that will comprise the outside of the folded piece. The "outside portion" is that portion of the unfolded piece that will appear on the outside of the folded piece. In other words, while a sheet of media only has two sides (e.g., first page and second page), only a portion (e.g., ½, ⅓, ¼, etc.) of the unfolded sheet will actually appear on the outside of the piece after it is folded.

The folded piece will have an "outside," which is the portion that the viewer would normally start reading or viewing, and an "inside." Therefore, this point in the process asks the user to identify that portion of one side of the unfolded sheet that should comprise, or appear on, the outside of the folded piece.

The process of finding out where the outside portion is located is an inquiry process that is different for different types of folds. Thus, the process of acquiring the outside portion designation can present different questions to the user depending upon the type of fold identified during the acquiring of the type of fold.

After the sheet(s) of media are printed by any standard printing or copying apparatus, the embodiments herein enable the sheet(s) of media to be automatically or manually folded into the folded piece using only the outside page designation, the direction of the first fold, the type of fold in item 114, and the outside portion designation. The process of automatically folding 114 can be performed by a machine without human intervention, other than any necessary human intervention that might be required to load sheets into the machine, remove sheets from the machine, perform maintenance on the machine, etc. In the absence of such automating equipment, this information may be used with human intervention to unambiguously comprehend the folding intent. Note that the processing shown in FIG. 1 can be performed in any order and is not limited to the order shown in FIG. 1.

Figure 2:
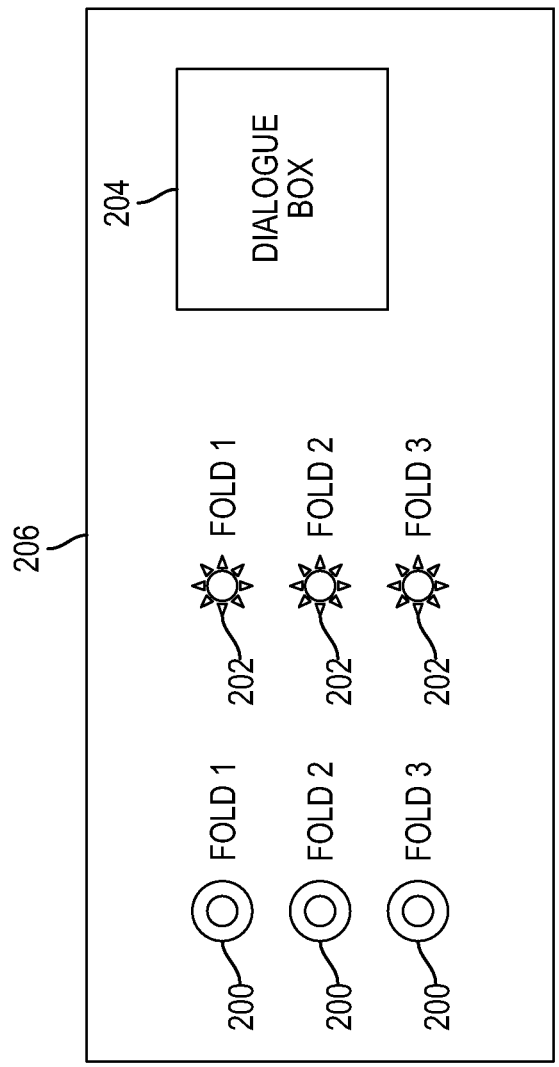
FIG. 2 is a schematic diagram of a user interface according to embodiments herein.

The user inputs regarding outside page designation, direction of first fold, type of fold, and outside portion can be gathered through any form of user interface such as a radio buttons 200, icons 202, dialogue boxes 204, etc. within a graphic user interface 206, as shown in FIG. 2. At least one embodiment provides multiple choice questions to the user, as shown in the graphic user interface 308 shown in FIG. 3. These multiple choice questions can each comprise a textual 300 or graphic question 302 and multiple pre-established responses. The pre-established responses comprise at least one of textual responses 304 and/or non-textual graphical responses 306. If the user answers the folding key(s) textually, then it may require a human being to perform interpretations of that text on the receiving end because embodiments herein provide a GUI for the user to click on the folding key graphically; However, human interpretation should not be required.

Thus, for example, the fold or folding key may be specified textually 300 (presenting the user with a text field that can be used to describe one or more parts of the folded piece that occur in a particular position) and/or graphically 302 (by presenting the user with a depiction of the flat piece with a series of selectable overlays to enable the same). As noted earlier, the folding key is facing and orientation agnostic. It is concerned only with aspects of the folded piece that are characteristic to its inside and/or outside.

Figure 3:
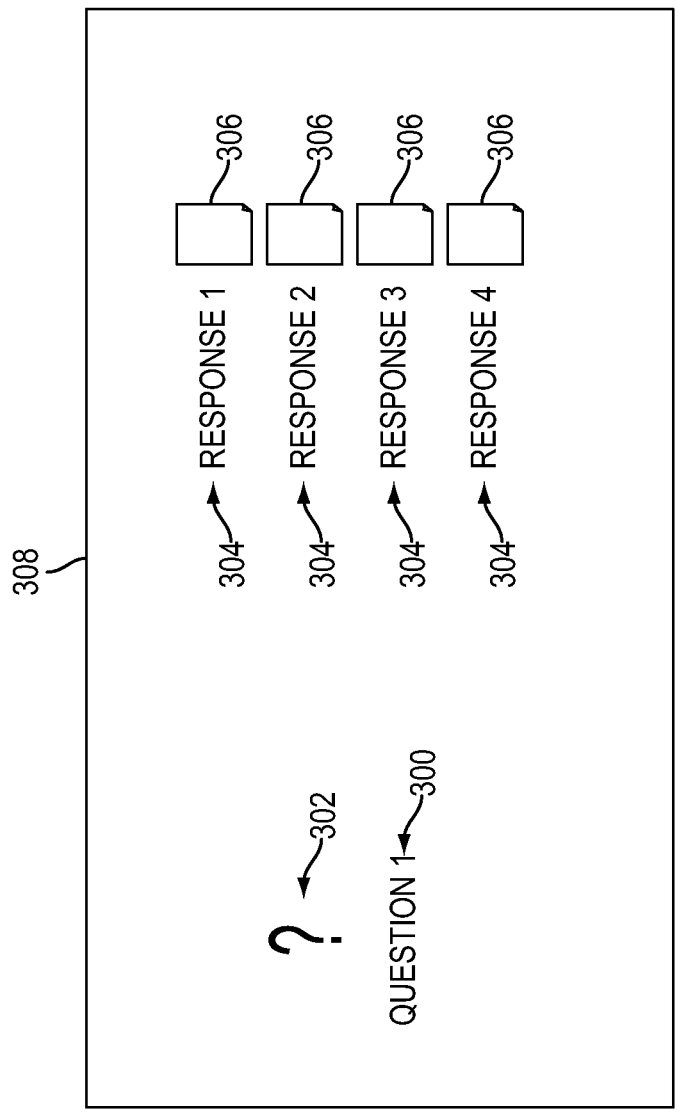
FIG. 3 is a schematic diagram of a user interface according to embodiments herein.
Figure 4B:
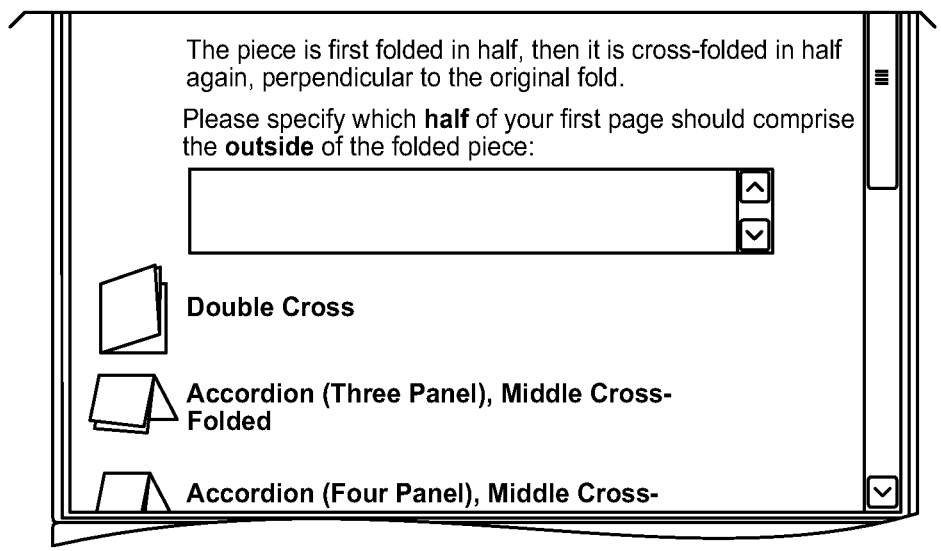

In addition, FIGS. 4A and 4B illustrate other forms the user interface may take. For example, FIGS. 4A and 4B are an example screen of a graphic user interface containing a combination of graphic and text questions/choices regarding fold options. The embodiments herein can use any one of and/or any combination of the elements shown in FIGS. 2-4B.

Figure 5:
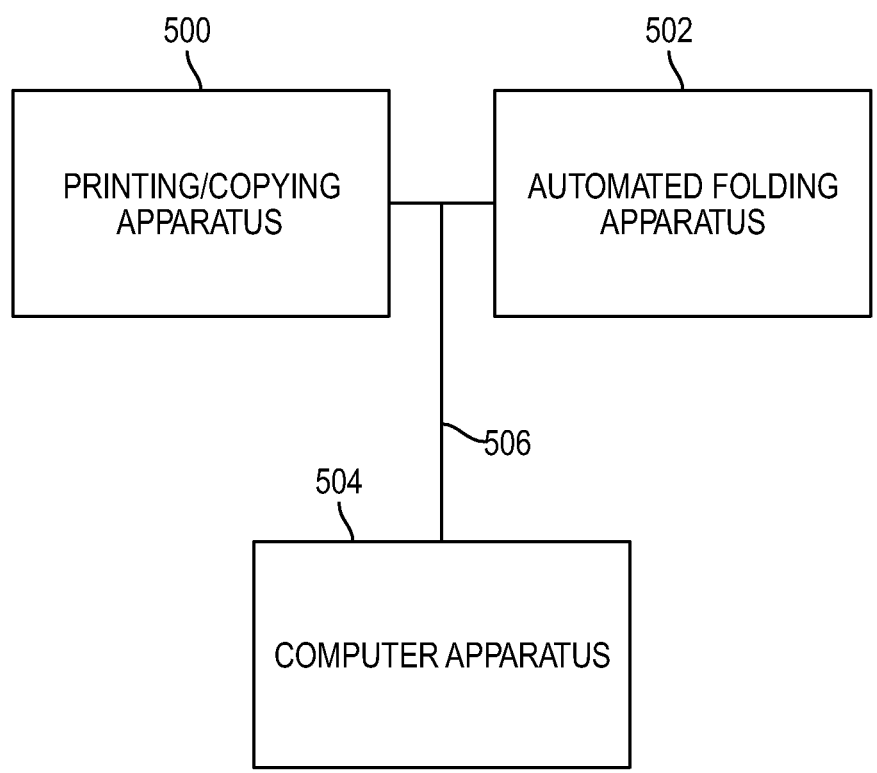
FIG. 5 is a schematic diagram of a system within which embodiments herein can operate.

FIG. 5 illustrates a printing/copying/finishing apparatus 500, a folding apparatus 502, a computer 504, a computer network 506 (wide area or local), etc. Many details of the apparatus 500 are omitted herefrom so as to focus the reader on the salient portions of the embodiments herein. Exemplary systems are disclosed in U.S. Patent Publications 2004/0071529 and 2002/0086786, and U.S. Pat. Nos. 6,551,229, 5,967,963, and 5,840,003 the complete disclosures of which are incorporated herein by reference.

The folding apparatus 502 can be part of the printing/copying/finishing apparatus 500 or can be a separate, stand-alone device. Further, the printing/copying/finishing apparatus 500, the folding apparatus 502, the computer 504, and anything within the computer network 506 can include the graphic user interface which is illustrated in FIGS. 2-4. Note that the folding apparatus 502, the computer 504, the computer network 506, etc. can comprise any form of similar devices currently known or developed in the future. Further, the methodology discussed herein can be embodied as a computer program product within the computer 504 comprising a computer-usable data carrier storing instructions that, when executed by a computer, cause the computer to perform the method described herein. Further, the method herein can be offered as a stand-alone service using the computer 504 and the computer network 506.

Examples of a series of folds including names, simple descriptions, and folding key parameters follow below. Note that the "[first|second]" indicator would display either "first" or "second" depending upon which page the user indicated as comprising the outside of the folded piece.

Parallel Folds

Fold Name: "Middle"
  Fold Description: "The piece is simply folded in half."
  Folding Key: [None]
Fold Name: "Accordion (Three Panel)"
  Fold Description: "A simple three-panel 'Z' fold, dividing the piece into equal thirds."
  Folding Key: "Please specify which third of your [first|second] page should be on the outside of the folded piece:"
Fold Name: "Simple Parallel"
  Fold Description: "A simple 'letter' fold, where the piece is folded into thirds."
  Folding Key: "Please specify which third of your [first|second] page should be on the inside of the folded piece:"
Fold Name: "Double Middle"
  Fold Description: "The piece is first folded in half, then it is folded in half again."
  Folding Key: "Please specify which half of your [first|second] page should comprise the outside of the folded piece:"
Fold Name: "Accordion (Four Panel)"
  Fold Description: "A four-panel accordion fold, dividing the piece into equal quarters."
  Folding Key: [None]
Fold Name: "Gate"
  Fold Description: "A standard gate fold, where the outer quarters are folded over to meet in middle of the piece."
  Folding Key: [None]
Fold Name: "Gate with Outward Middle Fold"
  Fold Description: "A simple gate fold which is folded once more down the middle, with the gates on the outside of the folded piece."
  Folding Key: [None]
Fold Name: "Gate with Inward Middle Fold"
  Fold Description: "A simple gate fold which is folded once more down the middle, with the gates on the inside of the folded piece."
  Folding Key: [None]
Fold Name: "Triple Parallel"
  Fold Description: "The piece is essentially 'rolled' into quarters."
  Folding Key: "Please specify which half of your [first|second] page should comprise the outside of the folded piece:"
Fold Name: "Accordion (Five Panel)"
  Fold Description: "A five-panel accordion fold, dividing the piece into equal fifths."
  Folding Key: "Please specify which fifth of your [first|second] page should be on the outside of the folded piece:"
Fold Name: "Accordion (Three Panel), Middle Folded"
  Fold Description: "A simple three-panel 'Z' fold which is folded once more, in half."
  Folding Key: "Please specify which third of your [first|second] page should be on the outside of the folded piece:"
Fold Name: "Simple Parallel, Middle Folded"
  Fold Description: "The piece is first folded into thirds in simple 'letter' fold fashion, then it is folded once more, in half."
  Folding Key 1: "Please specify which third of your [first|second] page should be on the inside of the piece prior to the final middle fold:"
  Folding Key 2: "Please specify which third of your [first|second] page should be on the outside of the finished piece:"
Fold Name: "Middle, Accordion (Three Panel)-Folded"
  Fold Description: "A simple 'middle' fold, which is folded again in equal thirds, in accordion fashion."
  Folding Key: "Please specify which full edge of your [first|second] page should be on the outside of the folded piece:"
Fold Name: "Middle, Simple Parallel-Folded"
  Fold Description: "A 'middle' fold, which is folded again in equal thirds in simple parallel ('letter') fashion."
  Folding Key: "Please specify which third of your [first|second] page should comprise the outside of the folded piece:"
Fold Name: "Accordion (Six Panel)"
  Fold Description: "A six-panel accordion fold, dividing the piece into equal sixths."
  Folding Key: [None]
Fold Name: "Triple Middle"
  Fold Description: "The piece is first folded in half, folded in half again, and folded in half a third time."
  Folding Key: "Please specify which quarter of your [first|second] page should comprise the outside of the folded piece:"
Fold Name: "Engineering"
  Fold Description: "Essentially an asymmetrical three-panel accordion fold, the paper is first folded in half, then one of those halves is folded in the opposite direction to permit the content on the inside of the folded piece to remain visible, while enabling the piece to fit into a binder designed to accommodate smaller pages. Note: this fold assumes that the first page of your document will comprise the front of the folded piece."
  Folding Key: "Please specify which half of your first page should be on the binding edge of the folded piece:"

Cross Folds

Fold Name: "Simple Cross"
  Fold Description: "The piece is first folded in half, then it is cross-folded in half again, perpendicular to the original fold."
  Folding Key: "Please specify which half of your [first|second] page should comprise the outside of the folded piece:"

Fold Name: "Accordion (Three Panel), Middle Cross-Folded"

Fold Description: "The piece is first folded in a simple three-panel 'Z' fold, then it is cross-folded in half, perpendicular to the original folds."

Folding Key: "Please specify which third of your [first|second] page should comprise the outside of the folded piece:"

Fold Name: "Simple Parallel, Middle Cross-Folded"

Fold Description: "The piece is first folded in a simple three-panel parallel ('letter') fold, then it is cross-folded in half, perpendicular to the original folds."

Folding Key 1: "Please specify which third of your [first|second] page should be on the inside of the piece prior to its final folding in half:"

Folding Key 2: "Please specify which third of your [first|second] page should be on the outside of the finished piece:"

Fold Name: "Middle, Accordion (Three Panel)-Cross Folded"

Fold Description: "The piece is first folded in half, and then it is cross-folded twice more into equal thirds in "accordion" fashion, perpendicular to the original fold."

Folding Key: "Please specify which two sixths of your [first|second] page should be on the outside of the folded piece:"

Fold Name: "Middle, Simple Parallel-Cross Folded"

Fold Description: "The piece is first folded in half, and then it is cross-folded twice more in simple parallel ("letter") fashion, perpendicular to the original fold."

Folding Key: "Please specify which corner of your [first|second] page should be on the outside of the folded piece:"

Fold Name: "Double Cross"

Fold Description: "The piece is first folded in half, then it is cross-folded in half again perpendicular to the original fold, then it is finally cross-folded in half, perpendicular to the second fold.

Folding Key: "Please specify which corner of your [first|second] page should be on the outside of the folded piece:"

Fold Name: "Double Middle, Middle Cross-Folded"

Fold Description: "The piece is first folded in half, then it is folded in half again parallel to the original fold, then it is cross-folded in half, perpendicular to the previous folds."

Folding Key: "Please specify which quarter of your [first|second] page should comprise the outside of the folded piece:"

Fold Name: "Accordion (Four Panel), Middle Cross-Folded"

Fold Description: "A four-panel accordion fold, which is then folded in half, perpendicular to the original folds."

Folding Key: "Please specify which quarter of your [first|second] page should comprise the outside of the folded piece:"

Fold Name: "Triple Parallel, Middle Cross-Folded"

Fold Description: "The piece is essentially 'rolled' into quarters, then it is folded in half, perpendicular to the original folds."

Folding Key: "Please specify which quarter of your [first|second] page should comprise the outside of the folded piece:"

Fold Name: "Double Accordion (3 Panel) Cross"

Fold Description: "The piece is folded into a simple accordion (three-panel) 'Z' fold, and then is folded once again in accordion (three-panel) 'Z' fold, perpendicular to the original folds."

Folding Key: "Please specify which corner of your [first|second] page should be on the outside of the folded piece:"

Fold Name: "Simple Parallel, Accordion (3 Panel) Cross-Folded"

Fold Description: "The piece is first folded into thirds in a simple parallel ("letter") fold, then it is folded once again in accordion "Z" fold, perpendicular to the original folds"

Folding Key: "Please specify which corner of your [first|second] page should be on the outside of the folded piece:"

Thus, as shown above, the embodiments herein provide a system, method, service, computer program, etc. that has the ability to enable simple, reliable communication of folds in a manner that reduces or eliminates human intervention and mystery regarding the resulting finished product. Therefore, the embodiments herein are of great value to both designers and production plants that routinely deal with folded matter, and enable a much higher percentage of jobs to make their way through an integrated, unassisted digital workflow. Moreover, embodiments herein can reliably support an unassisted workflow model for a wide variety of folded jobs, and provide a compelling competitive advantage under these scenarios.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A computer-implemented method comprising:
   using a computer, receiving a user request through a graphic user interface for a document job, wherein said document job comprises printing characteristics for making markings on a sheet of media and an indication to perform a fold operation for folding said sheet of media into a folded piece;
   using said computer, acquiring user input to identify an outside page designation of said folded piece;
   using said computer, acquiring user input to identify a direction of a first fold;
   using said computer, acquiring user input to identify a type of fold;

using said computer, after identifying said type of fold, acquiring user input to identify a portion designation of said outside page that will appear on an outside of said folded piece; and using said computer, folding said sheet of media into said folded piece using only said outside page designation, said direction of said first fold, said type of fold, and said portion designation.

2. The method according to claim 1, wherein when acquiring said direction of said first fold, said method inquires whether said direction of said first fold is perpendicular to a relatively longer end or a relatively shorter end of said sheet of media.

3. The method according to claim 1, wherein said outside page designation comprises a side of said sheet of media which contains markings that will appear on an exterior of said folded piece after said sheet of media is folded into said folded piece.

4. The method according to claim 1, further comprising, before said folding, printing said markings on said sheet of media.

5. A computer-implemented method comprising:
using a computer, receiving a user request through a graphic user interface for a document job, wherein said document job comprises printing characteristics for making markings on a sheet of media and an indication to perform a fold operation for folding said sheet of media into a folded piece;
using said computer, acquiring user input to identify an outside page designation of said folded piece;
using said computer, acquiring user input to identify a direction of a first fold;
using said computer, acquiring user input to identify a type of fold;
using said computer, after identifying said type of fold, acquiring user input to identify a portion designation of said outside page that will appear on an outside of said folded piece in an inquiry process that is different for different types of folds; and
using said computer, folding said sheet of media into said folded piece using only said outside page designation, said direction of said first fold, said type of fold, and said portion designation.

6. The method according to claim 5, wherein said process of acquiring said outside portion designation presents different questions to said user depending upon said type of fold identified during said acquiring of said type of fold.

7. The method according to claim 5, wherein when acquiring said direction of said first fold, said method inquires whether said direction of said first fold is perpendicular to a relatively longer end or a relatively shorter end of said sheet of media.

8. The method according to claim 5, wherein said outside page designation comprises a side of said sheet of media which contains markings that will appear on an exterior of said folded piece after said sheet of media is folded into said folded piece.

9. A computer-implemented method comprising:
using a computer, receiving a user request through a graphic user interface for a document job, wherein said document job comprises printing characteristics for making markings on a sheet of media and an indication to perform a fold operation for folding said sheet of media into a folded piece;
using said computer, providing multiple choice questions to said user to identify an outside page designation of said folded piece;
using said computer, providing multiple choice questions to said user to identify a direction of a first fold;
using said computer, providing multiple choice questions to said user to identify a type of fold;
using said computer, after identifying said type of fold, providing multiple choice questions to said user to identify a portion designation of said outside page that will appear on an outside of said folded piece in an inquiry process that is different for different types of folds; and
using said computer, folding said sheet of media into said folded piece using only said outside page designation, said direction of said first fold, said type of fold, and said portion designation.

10. The method according to claim 9, wherein at least one of said providing multiple choice questions to said user comprises providing a textual question and multiple preestablished responses, wherein said multiple pre-established responses comprise at least one of textual responses and non-textual graphical responses.

11. The method according to claim 9, wherein when acquiring said direction of said first fold, said method inquires whether said direction of said first fold is perpendicular to a relatively longer end or a relatively shorter end of said sheet of media.

12. The method according to claim 9, wherein said outside page designation comprises a side of said sheet of media which contains markings that will appear on an exterior of said folded piece after said sheet of media is folded into said folded piece.

13. A computer program product comprising:
a computer-readable storage medium tangibly storing instructions that, when executed by a computer, cause the computer to perform a method comprising:
receiving a user request through a graphic user interface for a document job, wherein said document job comprises printing characteristics for making markings on a sheet of media and an indication to perform a fold operation for folding said sheet of media into a folded piece;
acquiring user input to identify an outside page designation of said folded piece;
acquiring user input to identify a direction of a first fold;
acquiring user input to identify a type of fold;
after identifying said type of fold, acquiring user input to identify a portion designation of said outside page that will appear on an outside of said folded piece in an inquiry process that is different for different types of folds; and
folding said sheet of media into said folded piece using only said outside page designation, said direction of said first fold, said type of fold, and said portion designation.

14. The computer program product according to claim 13, wherein when acquiring said direction of said first fold, said method inquires whether said direction of said first fold is perpendicular to a relatively longer end or a relatively shorter end of said sheet of media.

15. The computer program product according to claim 13, wherein said outside page designation comprises a side of said sheet of media which contains markings that will appear on an exterior of said folded piece after said sheet of media is folded into said folded piece.

16. The computer program product according to claim 13, wherein said folding is performed by a machine without human intervention, or in the absence of the machine, is performed with human intervention.

17. A computer-readable storage medium, tangibly storing instructions that, when executed by a computer, cause the computer to perform the method comprising:
- receiving a user request for a document job, wherein said document job comprises printing characteristics for making markings on a sheet of media and an indication to perform a fold operation for folding said sheet of media into a folded piece;
- acquiring input to identify an outside page designation of said folded piece;
- acquiring input to identify a direction of a first fold;
- acquiring input to identify a type of fold;
- after identifying said type of fold, acquiring user input to identify a portion designation of said outside page that will appear on an outside of said folded piece in an inquiry process that is different for different types of folds; and
- causing a folding of said sheet of media into said folded piece using only said outside page designation, said direction of said first fold, said type of fold, and said portion designation.

* * * * *